(12) United States Patent
Doi

(10) Patent No.: US 7,182,452 B2
(45) Date of Patent: Feb. 27, 2007

(54) INK SET FOR INK JET RECORDING, INK JET RECORDING METHOD, AND INK JET RECORDING APPARATUS

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 266 days.

(21) Appl. No.: 10/862,372

(22) Filed: Jun. 8, 2004

(65) Prior Publication Data

US 2004/0257418 A1   Dec. 23, 2004

(30) Foreign Application Priority Data

Jun. 9, 2003   (JP) .............................. 2003-163455

(51) Int. Cl.
*C09D 11/02* (2006.01)
(52) U.S. Cl. ................... 347/100; 106/31.27; 106/31.6
(58) Field of Classification Search ................ 347/100; 106/31.6, 31.27
See application file for complete search history.

(56) References Cited

U.S. PATENT DOCUMENTS

2001/0023266 A1* 9/2001 Miyabayashi ............... 523/161

FOREIGN PATENT DOCUMENTS

| JP | A 8-337747 | 12/1996 |
| JP | B2 2667401 | 6/1997 |
| JP | 2001294788 A * | 10/2001 |

* cited by examiner

*Primary Examiner*—Manish S. Shah
*Assistant Examiner*—L E Martin
(74) *Attorney, Agent, or Firm*—Oliff & Berridge, PLC

(57) ABSTRACT

An ink set for ink jet using at least 3 or more of liquids, wherein the first liquid contains a colorant, a water soluble solvent and water, the second liquid contains a coagulant which coagulates components constituting the first liquid, a water soluble solvent and water, and the third liquid contains a compound capable of forming a chelate structure with the coagulant in the second liquid, a water soluble solvent and water; an ink jet recording method using the ink set; and an ink jet recording apparatus equipped with a recording head which injects the fore-mentioned ink set for ink jet from the recording head.

19 Claims, 5 Drawing Sheets

INK SET FOR INK JET RECORDING, INK JET RECORDING METHOD, AND INK JET RECORDING APPARATUS

CROSS-REFERENCE TO RELATED APPLICATIONS

This application claims priority under 35 USC 119 from Japanese patent document, No. 2003-163455, the disclosure of which is incorporated by reference herein.

BACKGROUND OF THE PRESENT INVENTION

1. Field of the Present Invention

The present invention relates to an ink set for ink jet, an ink jet recording method, and an ink jet recording apparatus.

2. Description of the Related Art

So-called ink-jet methods for ejecting a liquid or molten solid ink through an ink discharging port such as a nozzle, slit or porous film have been used for many printers since a printer using such a method is compact and inexpensive. A piezo ink-jet method for ejecting an ink by taking advantage of deformation of a piezoelectric element, a thermal ink-jet method for ejecting an ink by taking advantage of boiling of the ink by thermal energy, and the like are frequently used among the ink-jet methods since these methods enable high-resolution, high-speed printing. Ink-jet printers are used for printing on a paper sheet such as a regular paper sheet or an ink-jet paper sheet as well as on a film such as an OHP sheet and on cloth.

One of the currently important objects of the ink-jet printer is high speed and high quality printing of images. For attaining compatibility between high speed printing and high quality printing of an image, Japanese Patent No. 2667401 discloses a method comprising the steps of allowing a liquid containing a cationic group-bearing compound to adhere on a recording medium, allowing the liquid to permeate into the recording medium, and forming an image by allowing an anion dye-containing ink to adhere on the surface of the recording medium immediately after the liquid has been absorbed into the recording medium and has disappeared from the surface thereof. However, image density may be insufficient in this method when the drying time of the ink is shortened, and long-term reliability may be insufficient when the images are printed using a small volume of drops.

In order to prevent the scorching of an ink and enhance the ejecting stability of an ink, an ink containing an anionic dye, water, a compound forming a hardly soluble complex with a polyvalent metal, and an inorganic sulfate which makes the polyvalent metal water soluble are proposed in Japanese Patent Application Laid-Open (JP-A) No. 8-337747 and the like. The method is a method of stabilizing the polyvalent metal ion by use of the inorganic sulfate in order to prevent the insolubilization of a dye and the like, for example, by the polyvalent metal ions which are eluted from metal members such as an ink flow path. When the ink is mixed with a liquid containing the polyvalent metal, coagulation therefore the life of a maintenance unit has often been sometimes insufficient.

As described above, conventional methods have not been able to simultaneously satisfy optical density, feathering, intercolor bleeding, drying time and reliability of a maintenance unit.

SUMMARY OF THE PRESENT INVENTION

The present invention has been made in view of the above circumstances.

A first aspect of the present invention which is an ink set for an ink jet recording using at least 3 or more of liquids, wherein: the first liquid contains a colorant, a water soluble solvent and water, the second liquid contains a coagulant which coagulates components constituting the first liquid, a water soluble solvent and water; and the third liquid contains a compound capable of forming a chelate structure with the coagulant in the second liquid, a water soluble solvent and water.

A second aspect of the present invention is An ink jet recording apparatus comprising a recording head for ejecting respective liquids in an ink set for an ink jet recording, wherein: the ink set for ink jet recording has at least 3 or more of liquids, a first liquid contains a colorant, a water soluble solvent and water, a second liquid contains a coagulant which coagulates a component constituting the first liquid, a water soluble solvent and water; and a third liquid contains a compound capable of forming a chelate structure with the coagulant in the second liquid, a water soluble solvent and water.

A third aspect of the present invention is an ink jet recording method using at least 3 or more liquids, wherein: a first liquid contains a colorant, a water soluble solvent and water, a second liquid contains a coagulant which coagulates a component constituting the first liquid, a water soluble solvent and water, a third liquid contains a compound capable of forming a chelate structure with the coagulant in the second liquid, a water soluble solvent and water; and an image is formed by being deposited on a recording medium from a recording head so that the first liquid is brought in contact with the second liquid.

DETAILED DESCRIPTION OF THE PRESENT INVENTION

Figure 1:
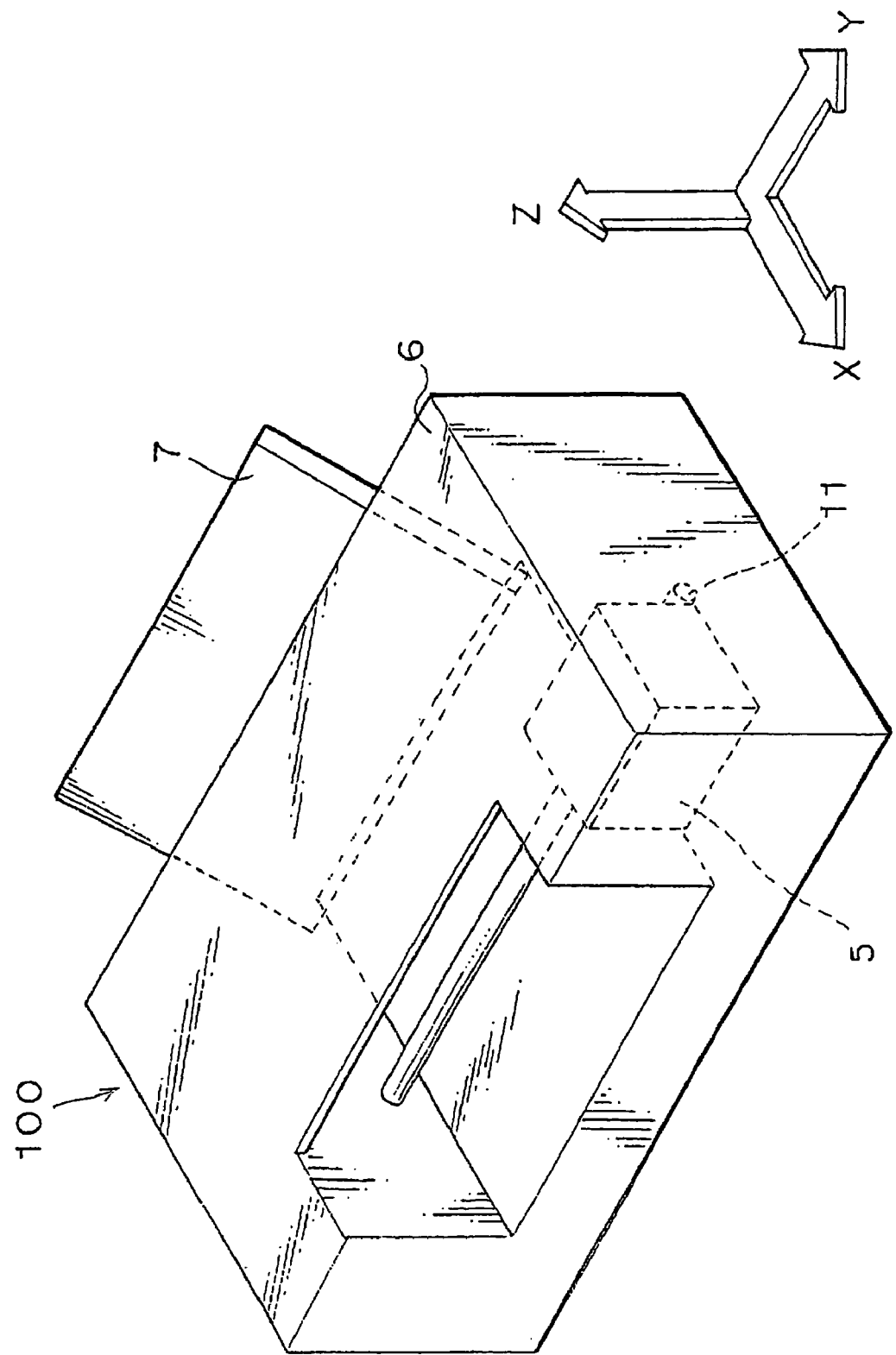
FIG. 1 is a perspective view showing the external constitution of a preferable embodiment of an image forming device of the present invention.

In the present invention, a recording solution for ink jet excellent in the optical density, feathering, intercolor bleeding, drying time and the reliability of a maintenance unit, an ink jet recording method, an ink collecting method and an ink jet recording apparatus can be provided by the above-mentioned first to fourth aspects.

Further, as one of aspects of the present invention, the $4^{th}$ to $22^{th}$ aspects are shown.

The forth aspect of the present invention is an ink set for ink jet recording according to the first aspect, wherein a chelate compound formed by the compound capable of forming a chelate structure with the coagulant is easily soluble in water.

The fifth aspect of the present invention is an ink set for ink jet recording according to the first aspect, wherein the colorant in the first liquid is a pigment, and the pigment is at least one kind selected from the group consisting a pigment which is dispersed by a polymer dispersant, a self-dispersible pigment and a pigment coated by a resin.

The sixth aspect of the present invention is an ink set for ink jet recording according to the first aspect, wherein the coagulant is a polyvalent metal salt.

The seventh aspect of the present invention is an ink set for ink jet recording according to the first aspect, wherein the second liquid contains a colorant.

The eighth aspect of the present invention is an ink set for ink jet recording according to the first aspect, wherein the third liquid contains a colorant.

The ninth aspect of the present invention is an ink set for ink jet recording according to the first aspect, wherein a number of coarse particles of 5 μm or more in the mixed solution of the first liquid and the second liquid is 1000/μL or more.

The tenth aspect of the present invention is an ink set for ink jet recording according to the first aspect, wherein a number of coarse particles of 5 μm or more in a mixed solution of the first liquid, the second liquid and the third liquid is less than 1000/μL.

The eleventh aspect of the present invention is an ink set for ink jet recording according to the first aspect, wherein a surface tension of the first liquid is 15 mN/m or more and 60 mN/m or less.

The twelfth aspect of the present invention is an ink set for ink jet recording according to the first aspect, wherein surface tensions of the second liquid and the third liquid are each 15 mN/m or more and 45 mN/m or less.

The thirteenth aspect of the present invention is an ink set for ink jet recording according to the first aspect, wherein viscosities of the first liquid, the second liquid and the third liquid are each 1.2 mPa·s or more and 6.0 mPa·s or less.

The fourteenth aspect of the present invention is an ink jet recording apparatus according to the second aspect, wherein a chelate compound formed by the compound capable of forming a chelate structure with the coagulant is easily soluble in water.

The fifteenth aspect of the present invention is an ink jet recording apparatus according to the second aspect, further comprising a maintenance unit, wherein the 3 or more liquids are kept in a condition in which they are mixed in a waste ink tank of the maintenance unit.

The sixteenth aspect of the present invention is an ink jet recording apparatus according to the fifteenth aspect, wherein the waste ink tank is single.

The seventeenth aspect of the present invention is an ink jet recording apparatus according to the fifteenth aspect, wherein the maintenance unit has a collecting portion where the first liquid, the second liquid and the third liquid which exist in the recording head are collected, the waste ink tank which stores the liquid collected, and a connecting portion which connects the collecting portion and the waste ink tank, and at least one portion of the connecting portion is a single path.

The eighteenth aspect of the present invention is an ink jet recording apparatus according to the second aspect, wherein the 3 or more liquids are ejected by use of a thermal ink jet system or a piezo ink jet system.

The nineteenth aspect of the present invention is an ink jet recording apparatus according to the second aspect, wherein the 3 or more liquids are deposited on a recording medium at 25 ng or less per drop.

The twentieth aspect of the present invention is an ink jet recording method according to the third aspect, wherein the first and second liquids are deposited on the recording medium so as to contact each other, and the third liquid is deposited on the recording medium to form an image.

A twenty first aspect of the present invention is an ink collecting method, wherein the first liquid, the second liquid and the third liquid of the first aspect are collected in a single waste ink tank from a recording head.

The twenty second aspect of the present invention is an ink collecting method according to the twenty first aspect, wherein the first liquid, the second liquid and the third liquid are collected in the waste ink tank from the recording head through a single path.

In the present invention, either of pigments and dyes can be used as the colorant. However, the colorant of the first liquid is preferably a pigment from the viewpoint of the improvement of image density at coagulation. On the other hand, the colorants contained in the second liquid and the third liquid are preferably dyes so that they can be preserved for a long term in a condition of coexistence with a coagulant.

As the pigment used in the present invention, either of an organic pigment and an inorganic pigment can be used. A black pigment includes carbon black pigments such as furnace black, lump black, acetylene black and channel black. Specified color pigments such as red, green, blue, brown and white, metal gloss pigments such as gold color and silver color, colorless or light color extender pigments, plastic pigments and the like may be used in addition to black and the three primary color pigments of cyan, magenta and yellow. Further, pigments newly synthesized for the present invention may also be used.

Specific example includes, but is not limited to, Raven 7000, Raven 5750, Raven 5250, Raven 5000, ULTRA II, Raven 3500, Raven 2000, Raven 1500, Raven 1250, Raven 1200, Raven 1190, ULTRA 11, Raven 1170, Raven 1255, Raven 1080 and Raven 1060 (trade names: manufactured by Colombian Chemicals Company); Regal 1400R, Regal 1330R, Regal 1660R, Mogul L, Black Pearls L, Monarch 700, Monarch 800, Monarch 880, Monarch 900, Monarch 1000, Monarch 1100, Monarch 1300 and Monarch 1400 (trade names: manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (trade names: manufactured by Degussa Co.); No. 25, No. 33, No. 40, No. 47, No. 52, No. 900, No. 2300, MCF-88, MA600, MA7, MA8, MA100 (trade names: manufactured by Mitsubishi Chemical Co., Ltd).

The cyan color includes, but is not limited to, C.I. Pigment Blue-1, -2, -3, -15, -15:1, -15:2, -15:3, -15:4, -16, -22, -60.

The magenta color includes, but is not limited to, C.I. Pigment Red-5, -7, -12, -48, -48:1, -57, -112, -122, -123, -146, -168, -184, -202.

Yellow color includes, but is not limited to, C.I. Pigment Yellow-1, -2, -3, -12, -13, -14, -16, -17, -73, -74, -75, -83, -93, -95, -97, -98, -114, -128, -129, -138, -151, -154, -180.

Further, in the present invention, a pigment which can be self-dispersed in water can be used as the pigment. The pigment which can be self-dispersed in water refers to a pigment which has many solubilizing groups in water on the pigment surface and is stably dispersed in water even if a polymer dispersant does not exist. Specifically, the pigment which can be self-dispersed in water can be obtained by carrying out surface modification treatments such as an acid or base treatment, a treatment by a coupling agent, a polymer graft treatment, a plasma treatment, or an oxidation or reduction treatment for a usual pigment etc.

Further, as the pigment which can be self-dispersed in water, commercially available self-dispersible pigments such as Cab-o-jet-200, Cab-o-jet-300, IJX-253, IJX-266, IJX-273, IJX-444 and IJX-55 (trade names: manufactured by Cabot Corporation) and Microjet Black CW-1 and CW-2 (trade names: manufactured by Orient Chemical Industries Ltd.,) can also be used in addition to the above-mentioned pigments which are obtained by carrying out the surface modification treatment.

When the pigment which can be self-dispersed in water is used as a pigment, a polymer substance can be contained in the liquid.

Further, a pigment coated with a resin and the like can be used as the colorant. This is called as a microcapsule pigment, and not only commercially available microcapsule pigments manufactured by Dainippon Ink and Chemicals Incorporated and manufactured by TOYO INK MFG. Co., Ltd. can be used, but also the microcapsule pigment prepared for the present invention can be used.

On the other hand, as the dye used in the present invention, either of a water soluble dye and a disperse dye can be used. Specific example of the water soluble dye includes C.I. Direct Black-2, -4, -9, -11, -17, -19, -22, -32, -80, -151, -154, -168, -171, -194, -195, C.I. Direct Blue-1, -2, -6, -8, -22, -34, -70, -71, -76, -78, -86, -112, -142, -165, -199, -200, -201, -202, -203, -207, -218, -236, -287, -307, C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -227, C.I. Direct Yellow-1, -2, -4, -8, -11, -12, -26, -27, -28, -33, -34, -41, -44, -48, -58, -86, -87, -88, -132-135, -142, -144, -173, C.I. Food Black-1, -2, C.I. Acid Black-1, -2, -7, -16, -24, -26, -28, -31, -48, -52, -63, -107, -112, -118, -119, -121, -156, -172, -194, -208, C.I. Acid Blue-1, -7, -9, -15, -22, -23, -27, -29, -40, -43, -55, -59, -62, -78, -80, -81, -83, -90, -102, -104, -111, -185, -249, -254, C.I. Acid Red-1, -4, -8, -13, -14, -15, -18, -21, -26, -35, -37, -52, -110, -144, -180, -249, -257, -289, C.I. Acid Yellow-1, -3, -4, -7, -11, -12, -13, -14, -18, -19, -23, -25, -34, -38, -41, -42, -44, -53, -55, -61, -71, -76, -78, -79, -122.

Specific example of the disperse dye includes C.I. Disperse Yellow-3, -5, -7, -8, -42, -54, -64, -79, -82, -83, -93, -100, -119, -122, -126, -160, -184:1, -186, -198, -204, -224, C.I. Disperse Orange-13, -29, -31:1, -33, -49, -54, -66, -73, -119, -163, C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356, -362, C.I. Disperse Violet-33, C.I. Disperse Blue-14, -26, -56, -60, -73, -87, -128, -143, -154, -165, -165:1, -176, -183, -185, -201, -214, -224, -257, -287, -354, -365, -368, C.I. Disperse Green-6:1, -9, and the like.

The colorant used in the present invention is used within a range of 0.5% by mass or more and 20% by mass or less based on the mass of the liquid and preferably within a range of 1% by mass or more and 10% by mass or less. When the amount of the colorant in the liquid is less than 0.5% by mass, a case of not obtaining sufficient optical density existed and when the amount of the colorant is more than 20% by mass, a case of not stabilizing the injection property of the liquid existed.

In the present invention, a polymer dispersant can also be used for dispersing a pigment. On the other hand, a polymer dispersant can also be added as a polymer substance when the pigment which can be self-dispersed in water is used. As the polymer dispersant, a nonionic compound, an anionic compound, a cationic compound, an amphoteric compound and the like can be used, and for example, the copolymer of a monomer having an $\alpha,\beta$-ethylenic unsaturated groups and the like can be used. The copolymer may have any of structures such as a random copolymer, a block copolymer and a graft copolymer.

Examples of the monomer of anionic compound having the $\alpha,\beta$-ethylenic unsaturated group include acrylic acid, methacrylic acid, crotonic acid, itaconic acid, itaconate monoester, maleic acid, maleate monoester, fumaric acid, fumarate monoester, vinyl sulfonic acid, styrene sulfonic acid, sulfonated vinyl naphthalene, vinyl alcohol, acrylamide, methacryloxyethyl phosphate, bismethacryloxyethyl phosphate, methacryloxyethyl phenyl acid phosphate, ethyleneglycol dimethacrylate, diethyleneglycol dimethacrylate, styrene, styrene derivatives such as $\alpha$-methylstyrene and vinyltoluene, vinylcyclohexane, vinylnaphthalene, vinylnaphthalene derivatives, alkyl acrylate, phenyl acrylate, alkyl methacrylate, phenyl methacrylate, cycloalkyl methacrylate, alkyl crotonate, dialkyl itaconate and dialkyl maleate.

The copolymer obtained by copolymerization of one kind of the monomer or plural kinds of monomers having the $\alpha,\beta$-ethylenic unsaturated groups may be used as the polymer dispersant. Examples of the polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

Examples of the nonionic polymer dispersant include polyoxyalkylene alkyl ether and polyoxyethylene alkylphenyl ether.

Examples of the cationic polymer dispersant include copolymers of N,N-dimethylaminoethyl methacrylate, N,N-dimethylaminoethyl acrylate, N,N-dimethylaminomethacrylamide, N,N-dimethylaminoacrylamide, N-vinylpyrrole, N-vinylpyridine, N-vinylpyrrolidone, and N-vinylimidazole; and monoalkylamine, monoalkyl dimethylamine, alkyl propyldiamine, alkyl dipropyltriamine, alkyl tripropyltetramine, polyoxyethylene alkylmethylbenzyl ammonium salt, alkylamine acetate and tetraalkylammonium chloride.

The amphoteric polymer dispersant include betaine compounds.

The polymer dispersant used in the present invention preferably has a weight average molecular weight of not less than 2000 and not larger than 15,000. Stable dispersion of the pigment may be impossible when the molecular weight of the polymer dispersant is less than 2,000, while ejectability may be deteriorated due to high viscosity when the molecular weight exceeds 15,000. The more preferable weight average molecular weight is 3,500 to 10,000.

The polymer dispersant added in the liquid is used within a range of 0.1% by mass or more and 3% by mass or less. When the addition amount exceeds 3% by mass, the viscosity of the liquid is occasionally increased and the injection property of the liquid is not occasionally stabilized. On the other hand, when the addition amount is less than 0.1% by mass, the dispersion stability of a pigment is occasionally deteriorated. The addition amount of the polymer dispersant is more preferably 0.15% by mass or more and 2.5% by mass or less, and further preferably 0.2% by mass or more and 2% by mass or less.

The colorant is essential for the first liquid. However, the colorant can also be contained in the second liquid and the third liquid. Also when it is contained in the second liquid and the third liquid, the above-mentioned colorant can be used.

Further, in the respective first to third liquids, 2 or more colorants can also be used in combination. However, it is more preferable that a single colorant is used in each of the liquids. The colors of the colorants of the first to third liquids are not specifically limited. However, the colorant of the first liquid is preferably black, and the colorants of the second and third liquids are preferably color.

As the water soluble organic solvent used in the present invention, polyvalent alcohols, polyvalent alcohols derivatives, solvents containing nitrogen, alcohols, solvents containing sulfur and the like are used. As specific example, the polyvalent alcohols include ethylene glycol, diethylene glycol, propylene glycol, butylene glycol, triethylene glycol, 1,5-pentanediol, 1,2,6-hexanetriol, glycerin. The polyvalent alcohols derivatives include ethyleneglycol monomethyl ether, ethyleneglycol monoethyl ether, ethyleneglycol monobutyl ether, diethyleneglycol monomethyl ether, diethyleneglycol monoethyl ether, diethyleneglycol monobutyl ether, propyleneglycol monobutyl ether, dipropyleneglycol monobutyl ether, the ethylene oxide-diglycerin adduct. The solvents containing nitrogen include pyrrolidone, N-methyl-2-pyrrolidone, cyclohexyl pyrrolidone, triethanolamine. The alcohols include ethanol, isopropyl alcohol, butyl alcohol, benzyl alcohol. The solvents containing sulfur include thiodiethanol, thiodiglycerol, sulfolane, dimethylsulfoxide. Additionally, propylene carbonate, ethylene carbonate and the like can also be used.

At least one or more of the water soluble organic solvents used in the present invention is preferably used. The content of the water soluble organic solvent is 1% by mass or more and 60% by mass or less and preferably 5% by mass or more and 40% by mass or less. When the amount of the water soluble organic solvents in the liquids is less than 1% by mass, sufficient optical density is not occasionally obtained. On the contrary, when it is more than 60% by mass, the viscosity of the liquid is occasionally large, and the injection property of the liquid is occasionally unstable.

In the present invention, a surfactant can also be added in the liquids. As the surfactant used in the present invention, a compound having both a hydrophilic portion and a hydrophobic portion in the molecule can be effectively used, and any of an anionic surfactant, a cationic surfactant, an amphoteric surfactant and a nonionic surfactant can be used. Further, the above-mentioned polymer dispersant can also be used.

As the anionic surfactant, there can be effectively used an alkylbenzene sulfonate, an alkylphenyl sulfonate, an alkylnaphthalene sulfonate, a salt of higher fatty acid, a sulfate of higher fatty acid ester, a sulfonate of higher fatty acid ester, a sulfate or a sulfonate of higher alcohol ester, a salt of higher alkylsulfosuccinic acid, a higher alkylphosphate, a phosphoric acid ester of a higher alcohol-ethylene oxide adduct. Example includes dodecylbenzene sulfonate, alkylbenzene sulfonate, isopropylnaphthalene sulfonate, monobutylphenylphenol mono sulfonate, monobutylbiphenyl sulfonate, monobutylbiphenyl sulfonate, dibutylphenylphenol disulfonate.

Example of the nonionic surfactant includes a polypropylene glycol-ethylene oxide adduct, polyoxyethylene nonylphenyl ether, polyoxyethylene octylphenyl ether, polyoxyethylene dodecylphenyl ether, polyoxyethylene alkyl ether, a fatty acid ester of polyoxyethylene, a fatty acid ester of sorbitan, a fatty acid ester of polyoxyethylene sorbitan, alkylol fatty acid amide, acetylene glycol, a acetylene glycol-ethylene oxide adduct, fatty acid alkanolamide, glycerin ester, sorbitan ester.

The cationic surfactant includes a tetraalkylammonium salt, an alkylamine salt, a benzalkonium salt, an alkylpyridinium salt, an imidazolium salt. Example includes dihydroxyethylstearylamine, 2-heptadecenyl-hydroxyethylimidazoline, lauryldimethylbenzylammonium chloride, cetylpyridinium chloride, stearamidemethylpyridinium chloride.

Additionally, bio surfactants such as spiclispolic acid, rhamnolipid and lysolecithin can also be used.

The amount of the surfactant added in the liquid of the present invention is preferably less than 10% by mass, more preferably 0.01% by mass or more and 5% by mass or less, and further preferably 0.01% by mass or more and 3% by mass or less. When the addition amount is 10% by mass or more, optical density and stable storability of a pigment ink are occasionally deteriorated.

As the coagulant, which makes the components of the first liquid coagulated, in the second liquid according to the present invention, a polyvalent metal salt is preferably used when the colorant containing an anionic group on the surface is contained in the first liquid. The colorant containing an anionic group on the surface includes a colorant which is a self-dispersible colorant and contains an anionic group on the surface, and additionally, a colorant in which an anionic polymer dispersant is adhered on the surface thereof. Further, it is preferable that a chelating agent is contained in the third liquid.

The polyvalent metal salt includes salts of polyvalent metal ions such as aluminum ion, barium ion, calcium ion, copper ion, iron ion, magnesium ion, manganese ion, nickel ion, tin ion, titanium ion and zinc ion, with hydrochloric acid, bromic acid, hydroiodic acid, sulfuric acid, nitric acid, phosphoric acid, thiocyanic acid, and organic carboxylic acids such as acetic acid, oxalic acid, lactic acid, fumaric acid, citric acid, salicylic acid and benzoic acid, and a salt of organic sulfonic acid, etc.

Specific example includes salts of polyvalent metals such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartarate, calcium lactate, calcium fumarate, calcium citrate, cupric chloride, cupric bromide, cupric sulfate, cupric nitrate, cupric acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, stannic sulfate, titanium tetrachloride, zinc chloride, zinc bromide, zinc sulfate, zinc nitrate, zinc thiocyanate and zinc acetate.

The preferable polyvalent metal salt includes aluminum sulfate, calcium chloride, calcium nitrate, calcium acetate, magnesium chloride, magnesium nitrate, magnesium sulfate, magnesium acetate, stannic sulfate, zinc chloride, zinc nitrate, zinc sulfate, zinc acetate, aluminum nitrate.

The chelating agent which can form a chelate structure with the polyvalent metal salt is not specifically limited. Example includes ethylenediamine, ethylenediamine tetraacetic acid, 1,2-propylenediamine tetraacetic acid, 1-phenylethylenediamine tetraacetic acid, 3,3-dimethylbutane-1,2-diamine tetraacetic acid, 1,2,3-triaminopropane hexaacetic acid, trimethylenediamine tetraacetic acid, nitrylo triacetic acid, 1,2-cyclohexadiamine tetraacetic acid, diethylenetriamine pentaacetic acid, glycol ethylenediamine tetraacetic acid, triethylenetetramine hexaacetic acid, triethylenetetramine, tetraethylenepentamine, propane-1,2-diamine, butane-1,2-diamine, 3,3-dimethylbutane-1,2-diamine, 1,2,3-triaminopropane, trimethylenediamine, tetralin-2,3-diamine tetraacetic acid, decalin-2,3-diamine tetraacetic acid, cyclohexane-1,2-diamine tetraacetic acid, cyclohexane-1,3-diamine tetraacetic acid, cyclohexane-1,4-diamine tetraacetic acid, oxalic acid, tiron, acetylacetone.

On the other hand, when the colorant containing a cationic group on the surface is contained in the first liquid, it is preferable that the polyvalent metal salt or the chelating agent is contained in the second liquid as the coagulant. The colorant containing a cationic group on the surface includes a colorant which is a self-dispersible colorant and contains a cationic group on the surface, and additionally, a colorant in which a cationic polymer dispersant is adhered on the surface of the colorant. Further, when the coagulant in the second liquid is a polyvalent metal salt, it is preferable that the chelating agent is contained in the third liquid. On the other hand, when the coagulant in the second liquid is a chelating agent, it is preferable that the polyvalent metal salt is added in the third liquid.

In the present invention, the coagulant may be singly used, or be used as 2 or more mixture. Further, the content of the coagulant in the liquid of the present invention is in a range of 0.1% by mass or more and 15% by mass or less, and preferably 0.5% by mass or more and 10% by mass or less.

In the present invention, a chelate compound is formed by chelating a compound in the third liquid with the coagulant in the second liquid, and the chelate compound is preferably easily soluble in water. In the present invention, the meaning that the chelate compound is easily soluble in water is that the solubility of the chelate compound in water at 23° C. is 0.1 g/L or more. When a chelate compound is hardly soluble in water, coagulation is generated at mixing 3 kind of the liquids, and life time of a maintenance unit is occasionally shortened.

The addition amount of the compound used in the third liquid according to the present invention is preferably 0.01% by mass or more, more preferably 0.1% by mass or more and 20% by mass or less, and further preferably 0.2% by mass or more and 5% by mass or less. When the addition amount is less than 0.01% by mass, coagulation is generated at mixing 3 kind of the liquids, and life time of a maintenance unit is occasionally shortened.

Additionally, in order to control the properties such as the improvement of ejecting property, there can be used for the respective first to third liquids, polyethyleneimine, polyamines, polyvinyl pyrrolidone, polyethylene glycol, cellulose derivatives such as ethylcellulose and carboxymethyl cellulose, polysaccharides and derivatives thereof, water soluble polymers, polymer emulsions such as an acryl-base polymer emulsion and a polyurethane-base emulsion, cyclodextrin, macrocyclic amines, dendrimers, crown ethers, urea and derivatives thereof, acetamide, a silicone-base surfactant, a fluorine-base surfactant and the like. Further, in order to adjust electroconductivity and pH, there can be used the compounds of alkali metals such as potassium hydroxide, sodium hydroxide and lithium hydroxide, nitrogen containing compounds such as ammonium hydroxide, triethanolamine, diethanolamine, ethanolamine and 2-amino-2-methyl-1-propanol, the compounds of alkali earth metals such as calcium hydroxide, acids such as sulfuric acid, hydrochloric acid and nitric acid, salts of a strong acid with a week alkali such as ammonium sulfate, and the like.

Additionally, according to need, a pH buffer, an antioxidant, a fungicide, a viscosity adjusting agent, a conductive agent, an ultraviolet absorber, a chelating agent and the like can also be added.

The recording materials of the present invention can be used not only for a normal ink jet recording apparatus, but also for a recording apparatus equipped with a heater and the like for controlling the drying of an ink, or a recording apparatus equipped with an intermediate transcription mechanism, and printing a recording material on the intermediate and then transcribing it on a recording medium such as a paper, and the like.

A method of improving image qualities such as optical density and feathering by designing an ink which provokes coagulation upon mixing 2 liquids has been conventionally proposed. However, when such a method is used, coagulation is generated when different inks are mixed in a waste ink tank, and therefore it is required that the inks that coagulate are stored in different waste ink tanks. Accordingly, there have been problems in that the size of a maintenance unit is increased and that cost becomes high, etc.

The present invention is characterized in that the first ink containing a colorant, a water soluble solvent and water, the second liquid containing a coagulant which coagulates components constituting the first liquid, a water soluble solvent and water, and additionally, the third liquid containing a compound capable of forming a chelate compound with the coagulant in the second liquid, a water soluble solvent and water are used. In the present invention, when the 3 liquids are mixed, the coagulant in the second liquid and the chelating agent in the third liquid form a chelate structure, and therefore the coagulant in the second liquid is prevented from coagulating the constituent of the first liquid. Accordingly, it is possible to use a single waste ink tank and store the 3 liquids therein. As a result, the size of a maintenance unit can be reduced, and cost can also be reduced.

Namely, the present invention has improved image qualities such as optical density and feathering by designing an ink which provokes coagulation upon mixing the first liquid and the second liquid. On the other hand, it has succeeded in reducing the size of a maintenance unit and lengthening the life time of the maintenance unit by designing the ink so as to inhibit the coagulation of the constituent in the waste ink tank in which the first to third liquids are mixed.

As the specific judgment of the degree of coagulation, the number of rough particles of 5 μm or more in the solution mixture of the first liquid and second liquid is preferably 1000/μL or more, more preferably 2500/μL or more and further preferably 5000/µL or more. When the number of coarse particles of 5 µm or more in the solution mixture of the first liquid and second liquid is less than 1000 numbers/µL, the optical density is occasionally deteriorated.

In the present invention, the number of coarse particles of 5 µm or more in the solution mixture of the first liquid and second liquid is measured by mixing the two liquids at a mass ratio of 1:1, sampling 2 µL under stirring, and using Accusizer™770 Optical Particle Sizer (trade name: manufactured by Particle Sizing Systems Co.). Further, as the parameter at measurement, the density of the pigment is input for the density of dispersed particles. The density of the pigment can be determined by measuring pigment powders obtained by heating and drying the pigment dispersion solution, by use of a specific gravity meter, a specific gravity bottle or the like.

The number of coarse particles of 5 µm or more in the solution mixture of the first liquid, second liquid and third liquid is preferably less than 1000/µL, more preferably less than 500/µL and further preferably less than 100/µL. When the number of coarse particles of 5 µm or more in the solution mixture of the first liquid, second liquid and third liquid is 1000/µL or more, the life of a maintenance unit is occasionally deteriorated.

In the present invention, the number of coarse particles of 5 µm or more in the solution mixture of the first liquid, second liquid and third liquid is measured by mixing the three liquids at a mass ratio of 1:1:1, sampling 2 µL under stirring, and using Accusizer™770 Optical Particle Sizer (trade name: manufactured by Particle Sizing Systems Co.).

The preferable embodiments of the image forming device of the present invention are illustrated below with reference to the drawings. Further, the same reference numbers are given to the same or corresponding portions in the drawings, and redundant explanation is omitted.

Figure 2:
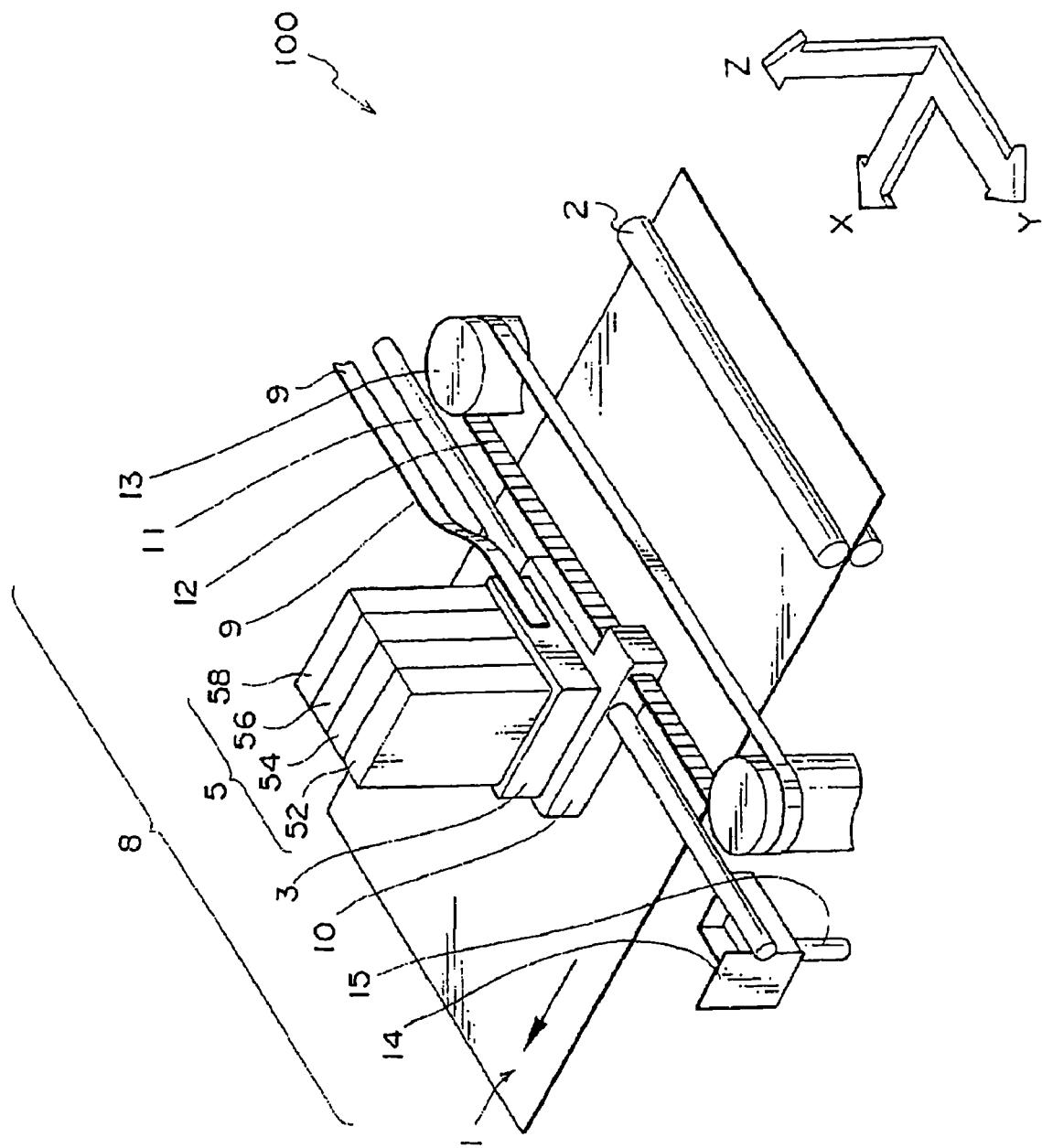
FIG. 2 is a perspective view showing the basic constitution of the interior of the image forming device of FIG. 1.
Figure 3:
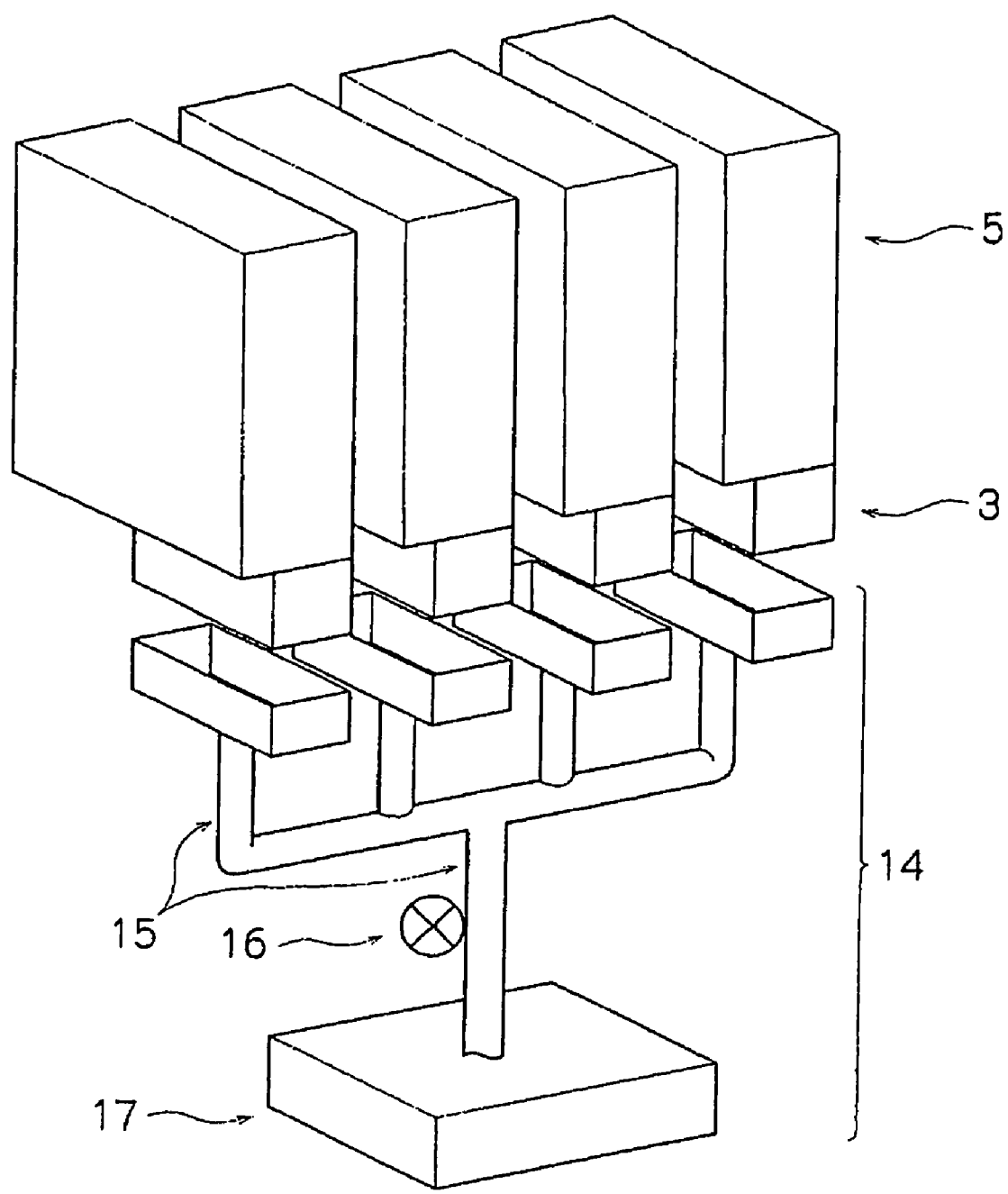
FIG. 3 is a perspective view showing the basic constitution of a maintenance unit in the image forming device of FIG. 1.
Figure 4:
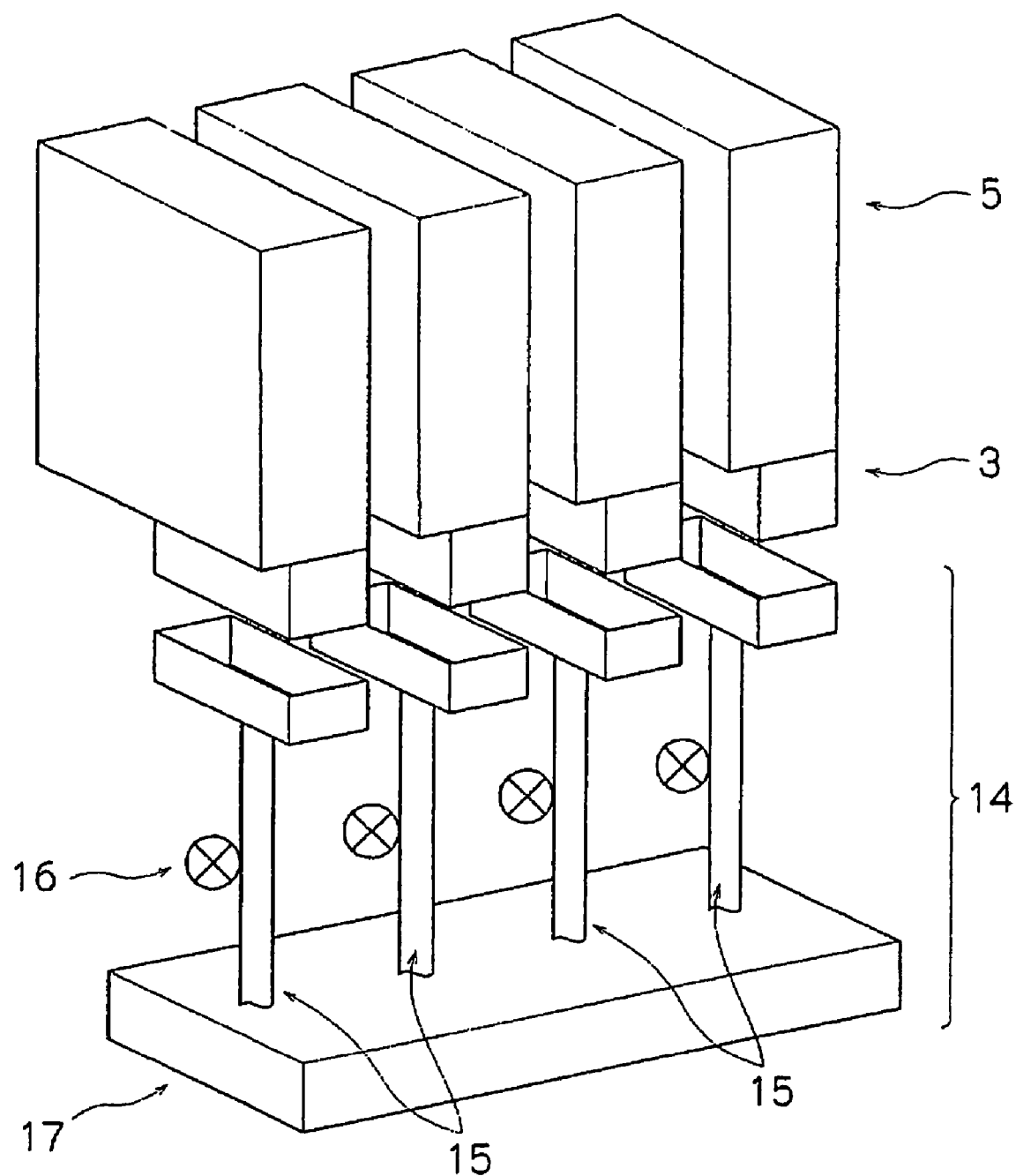
FIG. 4 is a perspective view showing the basic constitution of the maintenance unit in the image forming device of FIG. 1.
Figure 5:
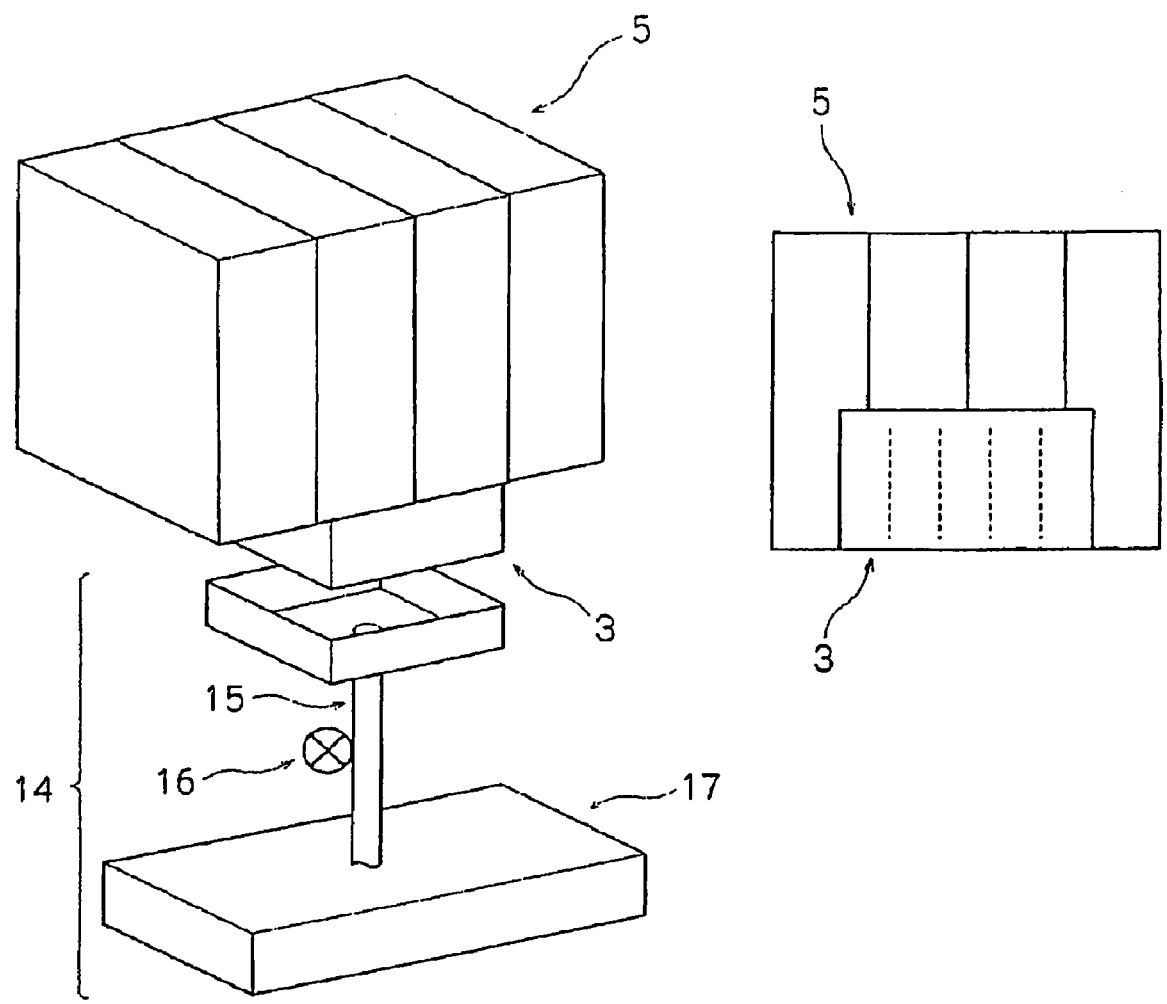
FIG. 5 is a perspective view showing the basic constitution of the maintenance unit in the image forming device of FIG. 1.

FIG. 1 is a perspective view showing the external constitution of one preferable embodiment of the image forming device of the present invention. FIG. 2 is a perspective view showing the basic constitution of the interior of the image forming device of FIG. 1. FIGS. 3 to 5 are perspective views showing the constitution from ink tanks to a maintenance unit in the image forming device. The image forming device 100 of the present embodiment has a constitution in which it is operated based on the above-described image forming method (ink jet recording method) of the present invention to form an image. Namely, as shown in FIG. 1 and FIG. 2, the image forming device 100 mainly comprises an external cover 6, a tray 7 on which a fixed amount of a recording medium 1 such as a normal paper can be mounted, conveyance rollers 2 (conveyance means) for conveying the recording medium 1 one by one to the inside of the image forming device 100, and an image forming portion 8 (image forming means) which ejects the ink and a liquid composition on the surface of the recording medium 1 to form an image.

The conveyance rollers 2 are a pair of rollers rotatably provided in the image forming device 100, hold the recording medium 1 set on the tray 7, and convey a fixed amount of the recording medium 1 one by one at a fixed timing to the inside of the image forming device 100 The image forming portion 8 forms an image with an ink on the surface of the recording medium 1. The image forming portion 8 mainly comprises a recording head 3, an ink tank set 5, a feed signal cable 9, a carriage 10, a guide rod 11, a timing belt 12, driving pulleys 13 and a maintenance unit 14.

The ink tank set 5 has ink tanks 52, 54, 56 and 58 in which inks having respectively different colors and a liquid composition are stored so as to be able to be ejected.

The first liquid, the second liquid and the third liquid according to the present invention are stored in these ink tanks.

Further, as shown in FIG. 2, the feed signal cable 9 and the ink tank set 5 are connected with the recording head 3, and when external image recording information is input from the feed signal cable 9 into the recording head 3, the recording head 3 sucks a specific amount of ink from each of the ink tanks based on the image recording information to eject it on the surface of the recording medium. The feed signal cable 9 also serves to feed electric power necessary for driving the recording head 3, in addition to the image recording information, to the recording head 3.

Further, the recording head 3 is arranged on the carriage 10 and retained thereon, and the guide rod 11 and the timing belt 12 which is connected with the driving pulleys 13 are connected with the carriage 10. According to this constitution, the recording head 3 is parallel with the surface of the recording medium 1 on which powders are scattered, along the guide rod 11, and can also be moved in the direction Y (main scanning direction) which is perpendicular to the conveyance direction X (sub scanning direction) of the recording medium 1.

The image forming device 100 is equipped with a control means (not illustrated) which adjusts the drive timing of the recording head 3 and the drive timing of the carriage 10 based on the image recording information. Thus, images based on the image recording information can be continuously formed on a predetermined region of the surface of the recording medium 1 which is conveyed at a predetermined speed along the conveyance direction X.

As shown in FIG. 3 to FIG. 5, the maintenance unit 14 has collecting portions which collect the liquids existing in the recording head, a waste ink tank, and a connecting portion which connects the collecting portions with the waste ink tank 17. Further, the maintenance unit 14 is connected to the nozzle portions of the recording head 3, and has a function of sucking ink from the nozzles of the recording head 3 by generating reduced pressure conditions inside the nozzles of the recording head 3 with a vacuum pump 16 provided in the connecting portion. In order to carry out suction of ink, a method of providing absorbing agents (sponge or the like) at the collecting portions can be used other than a vacuum pump. Excessive ink adhered on the nozzles can be removed as needed during the operation of the image forming device 100 by providing the maintenance unit 14, and evaporation of the ink from the nozzles can be suppressed in a state in which operation is stopped.

As shown in FIG. 3 and FIG. 4, the number of the collecting portions may be a plural number in accordance with the number of the ink tanks. As shown in FIG. 5, the collecting portion may be single. When a single collecting portion is provided, the first liquid, the second liquid and the third liquid are mixed in the collecting portion. However, coagulated material is unlikely to be generated due to the mixing, and clogs are suppressed.

As the connecting portion from the collecting portion to the waste ink tank, a tube or the like can be used. The connecting portion may be a single path as shown in FIG. 5, and may be a plural number in accordance with the number of the ink tanks as shown in FIG. 4. Further, as shown in FIG. 3, plural connecting portions can be connected with each other along the path to from a single tube. When the ink set of the present invention is used, places at which the connecting portions are connected are unlikely to be clogged and maintenance is easily carried out.

Further, the single waste ink tank is preferable for reducing the size of the maintenance unit. When the ink set of the present invention is used, coagulated material is unlikely to be generated in the inside of the waste ink tank, and maintenance property is superior even if waste ink is stored in the single waste ink tank for a long period.

In the present invention, the surface tension of the first liquid is preferably 15 mN/m or more and 60 mN/m or less. It is more preferably 15 mN/m or more and 45 mN/m or less and further preferably 20 mN/m or more and 35 mN/m or less.

When the surface tension is less than 15 mN/m, the liquid overflows on the nozzle plane, and printing may not be carried out normally. On the other hand, when it exceeds 60 mN/m, permeability is late, and drying time is occasionally long.

In the present invention, the surface tensions of the second liquid and third liquid are preferably each 15 mN/m or more and 45 mN/m or less, more preferably each 19 mN/m or more and 39 mN/m or less and further preferably 20 mN/m or more and 30 mN/m or less.

When the surface tensions are less than 15 mN/m, the liquid overflows on the nozzle plane, and printing may not be carried out normally. On the other hand, when they exceed 45 mN/m, permeability is late, and drying time is occasionally late.

In the present invention, the viscosities of the first liquid, second liquid and third liquid are preferably 1.2 mPa·s or more and 6.0 mPa·s or less, more preferably 1.5 mPa·s or more and less than 4.5 mPa·s, and further preferably 1.8 mPa·s or more and less than 4.0 mPa·s. When the viscosities of the first liquid and second liquid are larger than 6.0 mPa·s, ejecting property was occasionally lowered. On the other hand, when they are smaller than 1.2 mPa·s, the long term reliability is occasionally deteriorated.

In the present invention, the liquid mass per drop is preferably 25 ng or less. It is more preferably 0.5 ng or more and 20 ng or less, and further preferably 2 ng or more and 8 ng or less. When the liquid mass per drop exceeds 25 ng, the feathering is occasionally deteriorated. Because the contact angle of the first liquid and second liquid with respect to the recording medium is changed while it is dependent on the drop amount. It is considered because the drop tends to be easily spread to the direction of a paper surface in accordance with the increase of the drop amount.

However, in the ink jet device which enables the injection of a plural number of volumes of the drop from one nozzle, a drop amount having a minimum drop which can be printed is used as the above-mentioned drop amount.

When an ink is bestowed on the recording medium, it is preferable that the first liquid is brought in contact with the second liquid. The ink is coagulated by the action of the coagulant by the contact of the first liquid and second liquid, therefore a recording method excellent in the optical density, feathering, intercolor bleeding and drying time is obtained.

Further, the order of bestowal of the ink to the recording medium is not specifically limited so far as the third liquid is the last.

Further, it is preferable to adopt a thermal ink jet recording system or a piezo ink jet recording system from the viewpoints of the improvement effects of the feathering and intercolor bleeding. The reason is not clear yet. However, in the case of the thermal ink jet recording system, the ink is heated at ejection to be low viscosity, and the temperature of the ink is lowered on the recording medium, therefore viscosity is abruptly increased. Accordingly, it is considered that improvement effect is observed for the feathering and intercolor bleeding. On the other hand, in the case of the piezo ink jet recording system, the liquid having high viscosity can be ejected, and the liquid having high viscosity can be inhibited from being spread to a paper plane direction on the recording medium, therefore it is deduced that the improvement effect is observed for the feathering and intercolor bleeding.

EXAMPLES

Examples of the present invention are specifically illustrated below.

<Treatment Method of Pigment>

After a surface oxidation treatment is applied to a pigment with sodium hypochlorite, a desalting treatment is carried out. The surface treated pigment thus obtained is added to ion exchanged water so that the concentration of the pigment is 20% by mass, pH is adjusted to 7.5 and then, dispersion is carried out by use of an ultrasonic homogenizer. A centrifugal separation treatment (8000 rpm×30 minutes) is applied to the dispersion solution, and the residual portion (20% by mass based on the total amount) is removed.

<Preparation Method of Liquid>

A colorant solution, a water soluble organic solvent, a surfactant, ion exchanged water and the like are appropriately added so as to obtain a fixed composition, and the mixture is mixed and stirred. The liquid obtained is passed through a 1 μm filter to obtain a desired liquid.

| (Liquid A) | |
|---|---|
| Carbojet-300 | 4.5% by mass |
| Styrene-acrylic acid-sodium acrylate copolymer | 0.3% by mass |
| Diethylene glycol | 10% by mass |
| Glycerin | 5% by mass |
| Propylene glycol | 5% by mass |
| Urea | 4.5% by mass |
| Adduct of acetylene glycol with ethylene oxide | 0.2% by mass |
| Ion exchanged water | Balance |

The viscosity of the ink is 2.2 mPa·s and surface tension is 34 mN/m.

| (Liquid B) | |
|---|---|
| C.I. Acid Blue 9 | 3% by mass |
| Diethylene glycol | 10% by mass |
| Glycerin | 5% by mass |
| Butyl carbitol | 5% by mass |
| Adduct of acetylene glycol with ethylene oxide | 0.5% by mass |
| N,N-Bis(2-hydroxyethyl)-2-aminoethanesulfonic acid | 1.2% by mass |
| Sodium hydroxide | 0.6% by mass |
| Urea | 2% by mass |
| Isopropyl alcohol | 3.5% by mass |
| Magnesium nitrate | 0.1% by mass |
| Ion exchanged water | Balance |

The viscosity of the liquid is 1.9 mPa·s and surface tension is 30 mN/m.

| (Liquid C) | |
|---|---|
| C.I. Acid Red 52 | 3.5% by mass |
| Diethylene glycol | 10% by mass |

-continued

| (Liquid C) | |
|---|---|
| Propylene glycol | 5% by mass |
| Butyl carbitol | 5% by mass |
| Adduct of acetylene glycol with ethylene oxide | 0.5% by mass |
| N,N-Bis(2-hydroxyethyl)-2-aminoethanesulfonic acid | 1.2% by mass |
| Sodium hydroxide | 0.6% by mass |
| Urea | 2% by mass |
| Ethylenediamine tetraacetate | 1% by mass |
| Ion exchanged water | Balance |

The viscosity of the liquid is 2.1 mPa·s and surface tension is 32 mN/m.

| (Liquid D) A pigment treated in accordance with a pigment treatment method is prepared to be an ink in accordance with a fixed method. | |
|---|---|
| Black Pearls L (surface treatment) | 5% by mass |
| Styrene-acrylic acid-sodium acrylate copolymer | 0.3% by mass |
| Diethylene glycol | 15% by mass |
| N-methylpyrrolidone | 5% by mass |
| Urea | 3% by mass |
| Adduct of acetylene glycol with ethylene oxide | 1% by mass |
| Ion exchanged water | Balance |

The viscosity of the ink is 2.2 mPa·s and surface tension is 31 mN/m.

| (Liquid E) A pigment treated in accordance with a pigment treatment method is prepared to be an ink in accordance with a predetermined method. | |
|---|---|
| C.I. Pigment Blue 15:3 (surface treatment) | 3% by mass |
| Diethylene glycol | 10% by mass |
| Sulfolane | 5% by mass |
| Butyl carbitol | 5% by mass |
| Adduct of acetylene glycol with ethylene oxide | 1% by mass |
| Urea | 2% by mass |
| Isopropyl alcohol | 3.5% by mass |
| 1,2,3-triaminopropane hexaacetic acid | 0.75% by mass |
| Ion exchanged water | Balance |

The viscosity of the ink is 2.1 mPa·s and surface tension is 31 mN/m.

| (Liquid F) A pigment treated in accordance with a pigment treatment method is prepared to be an ink in accordance with a predetermined method. | |
|---|---|
| C.I. Pigment Red 122 (surface treatment) | 4% by mass |
| Diethylene glycol | 10% by mass |
| Triethylene glycol | 5% by mass |
| Acetylene glycol-ethylene oxide adduct | 1% by mass |
| Urea | 2% by mass |
| Isopropyl alcohol | 3.5% by mass |
| Calcium chloride | 0.1% by mass |
| Ion exchanged water | Balance |

The viscosity of the ink is 2.2 mPa·s and surface tension is 33 mN/m.

| (Liquid G) A pigment treated in accordance with a pigment treatment method is prepared to be an ink in accordance with a fixed method. | |
|---|---|
| C.I. Pigment Yellow 128 (surface treatment) | 4% by mass |
| Styrene-acrylic acid-sodium acrylate copolymer | 0.3% by mass |
| Diethylene glycol | 15% by mass |
| N-methylpyrrolidone | 5% by mass |
| Adduct of acetylene glycol with ethylene oxide | 2% by mass |
| Urea | 2% by mass |
| Isopropyl alcohol | 3.5% by mass |
| Ion exchanged water | Balance |

The viscosity of the ink is 2.1 mPa·s and surface tension is 32 mN/m.

| (Liquid H) | |
|---|---|
| Diethylene glycol | 20% by mass |
| 2-Pyrrolidone | 5% by mass |
| Acetylene glycol-ethylene oxide adduct | 0.5% by mass |
| Urea | 2% by mass |
| Isopropyl alcohol | 3% by mass |
| Magnesium nitrate | 2% by mass |
| Ion exchanged water | Balance |

The viscosity of the ink is 1.8 mPa·s and surface tension is 32 mN/m.

| (Liquid I) | |
|---|---|
| Diethylene glycol | 20% by mass |
| 2-Pyrrolidone | 5% by mass |
| Acetylene glycol-ethylene oxide adduct | 0.5% by mass |
| Urea | 2% by mass |
| Isopropyl alcohol | 3% by mass |
| 3,3-dimethylbutane-1,2-diamine tetraacetatic acid | 1% by mass |
| Ion exchanged water | Balance |

The viscosity of the ink is 1.8 mPa·s and surface tension is 32 mN/m.

| (Liquid J) | |
|---|---|
| Regal 330 (trade name: manufactured by Cabot Corporation) | 4.5% by mass |
| N-oleyl-1,3-diaminopropane | 0.5% by mass |
| Diethylene glycol | 10% by mass |
| Glycerin | 10% by mass |
| Acetylene glycol-ethylene oxide adduct | 0.2% by mass |
| Ion exchanged water | Balance |

The viscosity of the ink is 2.2 mPa·s and surface tension is 34 mN/m.

| (Liquid K) | |
|---|---|
| C.I. Acid Red 52 | 3% by mass |
| Diethylene glycol | 10% by mass |
| Glycerin | 5% by mass |
| Butyl carbitol | 5% by mass |
| Acetylene glycol - ethylene oxide adduct | 0.5% by mass |
| N,N-Bis(2-hydroxyethyl)-2-aminoethanesulfonic acid | 1.2% by mass |
| Sodium hydroxide | 0.6% by mass |
| Ethylenediamine tetraacetatic acid | 1.0% by mass |
| Isopropyl alcohol | 3.5% by mass |
| Ion exchanged water | Balance |

The viscosity of the ink is 2.1 mPa·s and surface tension is 30 mN/m.

| (Liquid L) | |
|---|---|
| C.I. Acid Blue 9 | 3% by mass |
| Diethylene glycol | 10% by mass |
| Glycerin | 5% by mass |
| Butyl carbitol | 5% by mass |
| Acetylene glycol - ethylene oxide adduct | 0.5% by mass |
| N,N-Bis(2-hydroxyethyl)-2-aminoethanesulfonic acid | 1.2% by mass |
| Sodium hydroxide | 0.6% by mass |
| Isopropyl alcohol | 3.5% by mass |
| Magnesium nitrate | 0.1% by mass |
| Ion exchanged water | Balance |

The viscosity of the ink is 1.9 mPa·s and surface tension is 30 mN/m.

<Evaluation Method by Printing>

There is used a trial manufacture printer which has a plural number of trial manufacture print heads having 800 dpi and 256 nozzles and a maintenance unit singly storing a plural number of inks. After the first, the second, and the fourth liquids are printed on a FX-P paper (trade name: manufactured by Fuji Xerox Co., Ltd.) by the combination shown in Table 1, the third liquid is printed. Further, the printing is carried out under general environment (a temperature of 23±0.5° C., and a humidity of 55±5% R.H) unless otherwise specified, and evaluation is carried out for a sample which is left alone under general environment for 24 hours after the printing.

(Optical Density)

The optical density of the printed portion is measured by use of X-Rite (trade name: manufactured by X-Rite Incorporated.)

Evaluation Criteria (Black Ink)
○: An optical density of 1.4 or more
Δ: An optical density of 1.3 or more and less than 1.4
X: An optical density of less than 1.3

Evaluation Criteria (Color Ink)
○: An optical density of 1.1 or more
Δ: An optical density of 1.0 or more and less than 1.1
X: An optical density of less than 1.0

(Intercolor Bleeding)

As for the evaluation of the intercolor bleeding, functional evaluation is carried out by printing patterns in which different colors are adjacent and referring the feathering degree of boundary portions to a limit specimen which was preliminarily set.

Evaluation Criteria
○: Those which have little feathering
Δ: Those which generate feathering but are at the allowable level
X: Those which have sever feathering and are out of the allowable range (Feathering)

Fine line patterns are printed and the feathering degree of printed portions are referred to a limit specimen to carry out functional evaluation.

Evaluation Criteria
○: Those which have little feathering
Δ: Those which generate feathering but are at the allowable level
X: Those which have sever feathering and are out of the allowable range (Drying Time)

After 100% coverage patterns are printed, another FX-P paper is pressed on the printed pattern at a load of $1.9 \times 10^4$ $N/m^2$ after the lapse of a fixed time. At this time, the time at which ink is not transcribed on the FX-P paper side pressed is defined as the drying time.

Evaluation Criteria
○: Drying time is less than 3 seconds
Δ: Drying time is 3 seconds or more and less than 10 seconds
X: Drying time is 10 seconds or more (Reliability of Maintenance Unit)

Maintenance operation is carried out 30 times for the reliability of maintenance unit.

The maintenance unit 14 is connected to the reduced pressure device through a tube as shown in FIG. 2, and also connected to the nozzle portions of the recording head 3. It has a function which sucks an ink from the nozzles of the recording head 3 by setting the inside of the nozzle portions of the recording head 3 in a reduced pressure condition. The maintenance operation means that the reduced pressure condition is prepared by a reduced pressure device.

After the maintenance operation is carried out 30 times, the machine is left alone for a week. Normal maintenance is carried out at initial start-up operation after the standing alone, and the ejecting condition of the head is observed.

Evaluation Criteria
○: Inks are ejected from all nozzles
Δ: Inks are not ejected from some nozzles at initial stage, but are ejected from all nozzles within 3 times of the maintenance operation
X: Inks are not ejected from some nozzles even after 3 times of the maintenance operation The evaluation result by printing is summarized in Table 1.

density, feathering, intercolor bleeding, drying time and the reliability of a maintenance unit.

TABLE 1

|  | Liquid 1 | Liquid 2 | Liquid 3 | Liquid 4 | Optical density | Feathering | Intercolor bleeding | Drying time | Reliability of maintenance |
|---|---|---|---|---|---|---|---|---|---|
| Example 1 | A | B | C | G | ○ | ○ | ○ | ○ | ○ |
| Example 2 | D | F | E | G | ○ | ○ | ○ | ○ | ○ |
| Example 3 | A | H | I | G | ○ | ○ | ○ | ○ | ○ |
| Example 4 | J | K | L | — | ○ | ○ | ○ | ○ | ○ |
| Comparative Example 1 | A | B | — | G | ○ | ○ | ○ | ○ | X |
| Comparative Example 2 | A | — | C | G | ○ | ○ | X | ○ | ○ |
| Comparative Example 3 | D | — | — | G | ○ | X | X | ○ | ○ |

As shown in Table 1, Examples 1 to 3 of the present invention are excellent in the optical density, feathering, intercolor bleeding, drying time and the reliability of a maintenance unit.

<Evaluation Method of Number of Rough Particles>

The number of rough particles of 5 μm or more in the solution mixture of the first liquid and second liquid is measured by mixing the two liquids at a mass ratio of 1:1, sampling 2 μL while they are stirred, and using Accusizer™770 Optical Particle Sizer (trade name: manufactured by Particle Sizing Systems Co.). Further, as the parameter at measurement, the density of the pigment is input for the density of dispersed particles.

The number of rough particles of 5 μm or more in the solution mixture of the first liquid, second liquid and third liquid is measured by mixing the three liquids at a mass ratio of 1:1:1, sampling 2 μL while they are stirred, and using Accusizer™770 Optical Particle Sizer (trade name: manufactured by Particle Sizing Systems Co.).

The evaluation result on the number of rough particles is summarized in Table 2.

TABLE 2

|  | Liquid 1 | Liquid 2 | Liquid 3 | Liquid 4 | Number of rough particles Liquid 1 + 2 | Number of rough particles Liquid 1 + 2 + 3 |
|---|---|---|---|---|---|---|
| Example 1 | A | B | C | G | 1800 | 250 |
| Example 2 | D | F | E | G | 1400 | 100 |
| Example 3 | A | H | I | G | 3500 | 850 |
| Example 4 | J | K | L | — | 1200 | 900 |
| Comparative Example 1 | A | B | — | G | 1800 | (1800) |
| Comparative Example 2 | A | — | C | G | 10 | (5) |
| Comparative Example 3 | D | L | — | G | 60 | (60) |

As shown in Table 2, in the combinations of the liquids according to the present invention, when the first liquid and the second liquid are mixed, the number of rough particles of 5 μm or more is 1000/μL or more, and when the first liquid, second liquid and third liquid are mixed, it is less than 1000/μL.

As described above, the ink set for ink jet, the ink jet recording method and the ink jet recording apparatus according to the present invention are excellent in the optical density, feathering, intercolor bleeding, drying time and the reliability of a maintenance unit.

What is claimed is:

1. An ink set for an ink jet recording using at least 3 or more liquids, the ink set comprising:
    a first liquid containing a colorant, a water soluble solvent and water;
    a second liquid containing a coagulant which coagulates components constituting the first liquid, a water soluble solvent and water; and
    a third liquid containing a compound capable of forming a chelate structure with the coagulant in the second liquid, a water soluble solvent, and water; wherein
    a number of coarse particles of 5 μm or more in a mixed solution of the first liquid, the second liquid, and the third liquid is less than 1000/μL.

2. An ink set for ink jet recording according to claim 1, wherein a chelate compound formed by the compound capable of forming a chelate structure with the coagulant is easily soluble in water.

3. An ink set for ink jet recording according to claim 1, wherein the colorant in the first liquid is a pigment, and the pigment is at least one kind selected from the group consisting a pigment which is dispersed by a polymer dispersant, a self-dispersible pigment and a pigment coated by a resin.

4. An ink set for ink jet recording according to claim 1, wherein the coagulant is a polyvalent metal salt.

5. An ink set for ink jet recording according to claim 1, wherein the second liquid contains a colorant.

6. An ink set for ink jet recording according to claim 1, wherein the third liquid contains a colorant.

7. An ink set for ink jet recording according to claim 1, wherein a number of coarse particles of 5 μm or more in the mixed solution of the first liquid and the second liquid is 1000/μL or more.

8. An ink set for ink jet recording according to claim 1, wherein a surface tension of the first liquid is 15 mN/m or more and 60 mN/m or less.

9. An ink set for ink jet recording according to claim 1, wherein surface tensions of the second liquid and the third liquid are each 15 mN/m or more and 45 mN/m or less.

10. An ink set for ink jet recording according to claim 1, wherein viscosities of the first liquid, the second liquid and the third liquid are each 1.2 mPa·s or more and 6.0 mPa·s or less.

11. An ink jet recording apparatus comprising a recording head for ejecting respective liquids in an ink set for an ink jet recording, wherein:
   the ink set for ink jet recording has at least 3 or more of liquids,
   a first liquid contains a colorant, a water soluble solvent and water,
   a second liquid contains a coagulant which coagulates a component constituting the first liquid, a water soluble solvent and water; and
   a third liquid contains a compound capable of forming a chelate structure with the coagulant in the second liquid, a water soluble solvent and water.

12. An ink jet recording apparatus according to claim 11, wherein a chelate compound formed by the compound capable of forming a chelate structure with the coagulant is easily soluble in water.

13. An ink jet recording apparatus according to claim 11, further comprising a maintenance unit, wherein the 3 or more liquids are kept in a condition in which they are mixed in a waste ink tank of the maintenance unit.

14. An ink jet recording apparatus according to claim 13, wherein the waste ink tank is single.

15. An ink jet recording apparatus according to claim 13, wherein the maintenance unit has a collecting portion where the first liquid, the second liquid and the third liquid which exist in the recording head are collected, the waste ink tank which stores the liquid collected, and a connecting portion which connects the collecting portion and the waste ink tank, and at least one portion of the connecting portion is a single path.

16. An ink jet recording apparatus according to claim 11, wherein the 3 or more liquids are ejected by use of a thermal ink jet system or a piezo ink jet system.

17. An ink jet recording apparatus according to claim 11, wherein the 3 or more liquids are deposited on a recording medium at 25 ng or less per drop.

18. An ink jet recording method using at least 3 or more liquids, wherein:
   a first liquid contains a colorant, a water soluble solvent and water,
   a second liquid contains a coagulant which coagulates a component constituting the first liquid, a water soluble solvent and water,
   a third liquid contains a compound capable of forming a chelate structure with the coagulant in the second liquid, a water soluble solvent and water; and
   an image is formed by being deposited on a recording medium from a recording head so that the first liquid is brought in contact with the second liquid.

19. An ink jet recording method according to claim 18, wherein the first and second liquids are deposited on the recording medium so as to contact each other, and the third liquid is deposited on the recording medium to form an image.

* * * * *